(12) United States Patent
Taylor et al.

(10) Patent No.: US 11,682,289 B1
(45) Date of Patent: Jun. 20, 2023

(54) SYSTEMS AND METHODS FOR INTEGRATED TRAFFIC INCIDENT DETECTION AND RESPONSE

(71) Applicant: United Services Automobile Association (USAA), San Antonio, TX (US)

(72) Inventors: Samantha Elizabeth Taylor, Frisco, TX (US); Yogen Rai, Plano, TX (US); Zachery C. Lake, Aubrey, TX (US); Rachel Elizabeth Csabi, Frisco, TX (US); Hollie Ilene King, Frisco, TX (US); Nicholas C. Wheeler, The Colony, TX (US); Victor Kwak, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 294 days.

(21) Appl. No.: 16/940,026

(22) Filed: Jul. 27, 2020

Related U.S. Application Data

(60) Provisional application No. 62/881,119, filed on Jul. 31, 2019.

(51) Int. Cl.
| | |
|---|---|
| *G08B 25/00* | (2006.01) |
| *G07C 5/08* | (2006.01) |
| *H04L 12/40* | (2006.01) |
| *G07C 5/00* | (2006.01) |

(Continued)

(52) U.S. Cl.
CPC ........... *G08B 25/006* (2013.01); *G06V 20/56* (2022.01); *G07C 5/008* (2013.01); *G07C 5/0808* (2013.01); *G07C 5/0816* (2013.01); *H04L 12/40032* (2013.01); *G07C 2205/02* (2013.01); *H04L 2012/40273* (2013.01); *H04N 23/54* (2023.01)

(58) Field of Classification Search
CPC ...... G08B 25/006; G06V 20/56; G07C 5/008; G07C 5/0808; G07C 5/0816; G07C 2205/02; H04L 12/40032; H04L 2012/40273; H04N 5/2253
USPC ........................................................ 701/31.7
See application file for complete search history.

(56) References Cited

U.S. PATENT DOCUMENTS

| | | | |
|---|---|---|---|
| 9,767,625 B1 * | 9/2017 | Snyder | G07C 5/008 |
| 10,032,318 B1 * | 7/2018 | Ferguson | G07C 5/0816 |

(Continued)

*Primary Examiner* — Muhammad Shafi
(74) *Attorney, Agent, or Firm* — Fletcher Yoder, P.C.

(57) ABSTRACT

An electronic device receives operational data indicative of an operational characteristic of a vehicle from a sensor of the electronic device, a sensor of the vehicle, and/or images/ videos captured by a camera. The electronic device determines that the vehicle has had a potential incident and a likelihood that the potential incident has actually occurred based on analysis of the operational data. The electronic device also receives risk management data associated with the vehicle from a database, and determines a severity level for the potential incident based on the operational data and the risk management data. The electronic device then sends a notification indicative of the potential incident based on the likelihood that the potential incident has actually occurred and the severity level for the potential incident to a third-party remote system (e.g., of a towing service, an emergency service, or both) to request assistance.

20 Claims, 3 Drawing Sheets

(51) Int. Cl.
*G06V 20/56* (2022.01)
*H04N 23/54* (2023.01)

(56) References Cited

U.S. PATENT DOCUMENTS

2015/0294422 A1* 10/2015 Carver .................. G06Q 40/08
                                                                705/4
2017/0053461 A1*  2/2017 Pal ....................... G06V 20/597

* cited by examiner

SYSTEMS AND METHODS FOR INTEGRATED TRAFFIC INCIDENT DETECTION AND RESPONSE

CROSS-REFERENCE TO RELATED APPLICATIONS

This application claims priority to and the benefit of U.S. Provisional Patent Application No. 62/881,119, entitled "Systems and Methods for Integrated Traffic Incident Detection and Response," filed Jul. 31, 2019, which is hereby incorporated by reference in its entirety for all purposes.

BACKGROUND

The present disclosure relates generally to traffic incidents, and more particularly to systems and methods for detecting that a traffic incident has occurred and responding to the traffic incident.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

While the ubiquity of mobile electronic devices and widespread communication networks have facilitated capturing information that was previously much more difficult to capture, it is now recognized that certain types of information, such as information related to traffic incidents, remain difficult to obtain. Specifically, it is now recognized that there is a need for improve traffic incident detection and response.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a vehicular incident detection and management system includes a sensor that detects an operational characteristic of a vehicle. The system also includes a communication interface that receives operational data indicative of the operational characteristic from the sensor, and receives risk management data associated with the vehicle from a database. The system further includes one or more processors and one or more memory devices that store instructions that, when executed by the one or more processors, cause the one or more processors to identify that the vehicle has had a potential incident and a likelihood that the potential incident has actually occurred based on analysis of the operational data. The instructions also cause the one or more processors to determine a severity level for the potential incident based on the operational data and the risk management data, and send a notification indicative of the potential incident based on the likelihood and the severity level to a remote system via the communication interface.

In one embodiment, one or more tangible, non-transitory, computer-readable media stories instructions that, when executed by one or more processors, cause the one or more processors to determine that a vehicle has had a potential traffic incident and a likelihood that the potential traffic incident was an actual traffic incident based on one or more operational characteristics of the vehicle received from one or more device sensors of an electronic device and/or vehicle sensor information received from one or more vehicle sensors, one or more images or videos captured by a camera. The instructions also cause the one or more processors to determine a severity level of the potential traffic incident based on risk data stored in a risk management database and/or the images or the videos captured by the camera, or any combination thereof. The instructions further cause the one or more processors to send a request for assistance to a third party based on the likelihood that the potential traffic incident has actually occurred and/or the severity level of the potential traffic incident.

In one embodiment, a method includes determining that a vehicle has had a potential incident and a likelihood that the potential incident has actually occurred based on operational characteristics of the vehicle received from one or more vehicle sensors of the vehicle, one or more device sensors of an electronic device, and/or one or more images or videos captured by a camera of the vehicle or the electronic device. The method also includes determining a severity for the potential incident based on risk data stored in a database and the operational characteristics of the vehicle. The method further includes sending a notification for assistance to an external device based on the likelihood that the traffic incident has occurred and/or the severity of the traffic incident.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
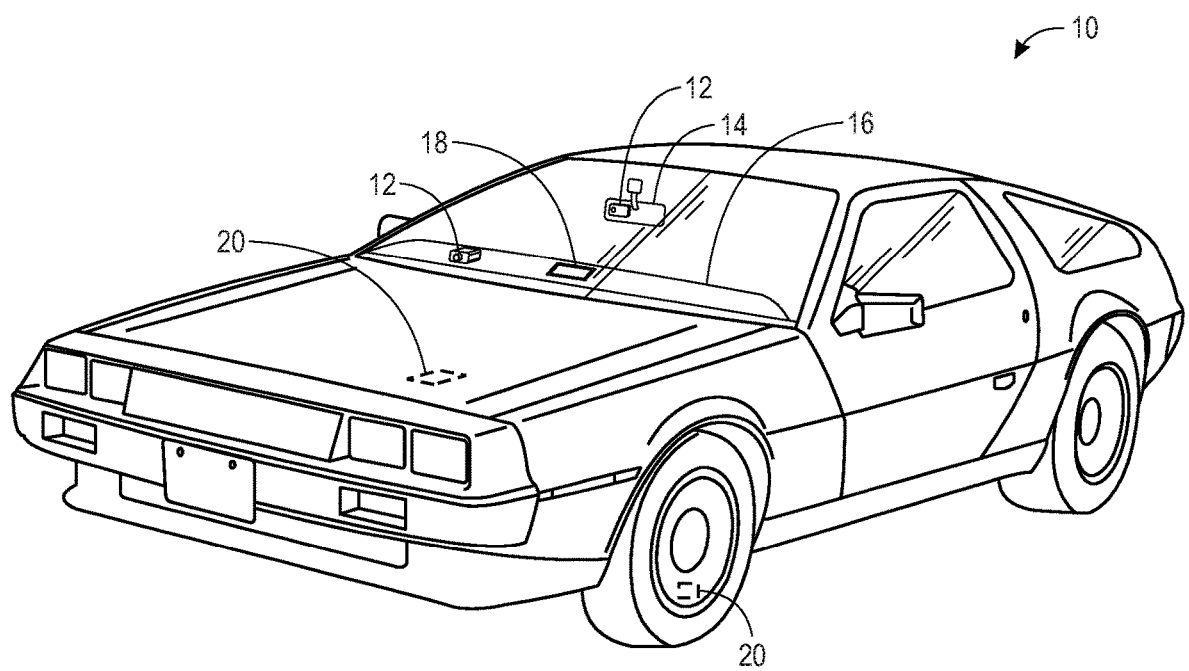
FIG. 1 is a diagram of a vehicle including a system that monitors for traffic incidents, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to traffic incidents, and more particularly to systems and methods for detecting that a traffic incident has occurred and responding to the traffic incident. A mobile electronic device, such as a smartphone, a smart watch, and so on, may receive an indication that a traffic incident has occurred. For example, a sensor (e.g., an accelerometer) of the mobile electronic device or a sensor of the vehicle (e.g., an engine or tire rotation sensor) may indicate that a vehicle has decelerated at an excessive rate, indicating impact of the vehicle with another vehicle or object. A vehicle-mounted camera (e.g., a dashcam) may be communicatively coupled to the vehicle-mounted camera (e.g., via a communication network), and send captured images or video of the surrounding environment of the vehicle to the mobile electronic device. The mobile electronic device may determine the likelihood that a traffic incident has occurred based on the sensor data, including the captured images or videos. As a result, the mobile electronic device may request, receive, and/or save images and/or video before, during, and after the traffic incident.

The mobile electronic device may also determine a severity of the traffic incident based on predetermined data (e.g., the type of vehicle, the age of the vehicle, the typical number of occupants of the vehicle, the age of the likely occupants of the vehicle) that may be, for example, gathered from vehicle insurance data covering the vehicle, data captured at or near the time of the traffic incident (e.g., the time of day, the date, the weather, and/or the location), and/or analysis of the captured images or video (e.g., determining a lateral, rotational, or spin velocity or acceleration of the captured images or video). "Likelihood", as used herein, indicates a probability that a potential traffic incident occurred. "Severity", as used herein, indicates a degree of injury, damage, significance, and/or impact to occupants of the vehicle, other occupants of other vehicles, pedestrians, bystanders, the vehicle, other vehicles, and/or nearby property. In some embodiments, the mobile electronic device may apply machine-learning techniques in conjunction with public and/or private data stores to determine the likelihood and/or severity of the traffic incident.

The mobile electronic device may determine the likelihood of the traffic incident having occurred and/or the severity of the traffic incident as percentages or scores. If the likelihood and/or severity exceed respective thresholds, then the mobile electronic device may send a communication to a third party requesting assistance. For example, the mobile electronic device may determine that the likelihood of the traffic incident exceeds a traffic incident likelihood threshold, and, as a result, the mobile electronic device may determine a local tow truck company that is approved by the driver's insurance company and send a communication to the local tow truck company that the vehicle may have been involved in a traffic incident. As an additional or alternative example, if the mobile electronic device determines that the severity of the traffic incident exceeds a traffic incident severity threshold, then the mobile electronic device may send a communication to an emergency service (e.g., an ambulance).

With the foregoing in mind, FIG. 1 is a diagram of a vehicle 10 including a system (e.g., a vehicular incident detection and management system) that monitors for traffic incidents, according to embodiments of the present disclosure. While the vehicle 10 is illustrated as an automobile, it should be understood that the present disclosure applies to any suitable vehicle, such as a truck, motorcycle, commercial vehicle, recreational vehicle, all-terrain vehicle, boat, airplane, snowmobile, and the like. The vehicle 10 may include one or more cameras 12. In some embodiments, a camera 12 may be installed by the vehicle manufacturer and mounted to any suitable component of the vehicle 10, such as a rear-view mirror 14. In alternative or additional embodiments, the camera 12 may be an aftermarket product that is purchased and/or installed by the driver of the vehicle 10 or a vehicle electronics installer. Such a camera 12 may also be mounted to any suitable component of the vehicle 10, such as a dashboard 16.

The camera 12 may include any suitable device that captures images and/or videos. Moreover, while the camera 12 is shown as being mounted in the interior of the vehicle 10, the camera 12 may be attached to any suitable portion of the vehicle 10 or other location to capture images and/or videos of the surrounding area of the vehicle 10, such as on the exterior of the vehicle 10 or separate from the vehicle 10. For example, the camera 12, in some cases, may be hand-held, mounted to an article of clothing (e.g., a helmet) of an occupant of the vehicle 10, or so on. In some cases, the camera 12 may be part of any suitable computing device in the vehicle 10, such as a mobile electronic device 18 of an occupant of the vehicle 10, including, and without limitation, a smartphone, laptop, wearable smart device, tablet, a dedicated electronic device that may be communicatively coupled to the vehicle 10 that facilitates detecting traffic incidents and/or responding to traffic incidents, and the like. The camera 12 may capture videos at any suitable frame rate, including any frame rate between 20 and 100 frames per second (fps), such as 23.976 fps, 23.98 fps, 24 fps, 25 fps, 29.97 fps, 30 fps, 50 fps, 59.94 fps, 60 fps, and the like.

The mobile electronic device 18 may include a number of device sensors that facilitate determining whether the vehicle 10 has been in a traffic incident. For example, the mobile electronic device 18 may include accelerometers, gyroscopes, magnetometers, location sensors (e.g., that use global positioning system (GPS) technology), and so on, that may facilitate determining acceleration and/or speed of the vehicle 10. As such, the device sensors may facilitate determining when the vehicle 10 has undergone, for example, excessive deceleration indicative of the vehicle 10 being in a traffic incident. Traffic incident, as used herein, may include, without limitation, traffic crashes, disabling of the vehicle 10 (e.g., tire deflation, engine malfunction), interaction with spilled cargo, interaction with highway maintenance and reconstruction projects, or any other event that would cause a hindrance to or a decrease in the performance of the vehicle 10.

The vehicle 10 may also include a number of vehicle sensors 20 (in addition to the camera 12) that may facilitate determining whether the vehicle 10 has been in a traffic incident. For example, the vehicle 10 may include a speed sensor, an acceleration sensor, a component operation sensor (e.g., an engine operation sensor), a wheel rotation speed sensor, a tire air pressure sensor, a coolant temperature sensor, an oil temperature sensor, an oil pressure sensor, a crumple zone detection sensor, and so on, that may facilitate determining acceleration, speed, and/or operation of the vehicle 10. As such, the vehicle sensors 20 may be used to determine when, for example, the vehicle 10 has undergone excessive deceleration, component damage, component operational failure, structural damage (e.g., a change to a windshield, window, tire, wheel, axle, frame, crumple zone of the vehicle 10), operational parameters (e.g., temperature, pressure) outside of a threshold range, and so on, which may be indicative of the vehicle 10 being in a traffic incident. In some cases, images and/or videos captured by the camera 12 may be analyzed to facilitate determining whether the vehicle 10 has been in a traffic incident. For example, a processor of the camera 12 and/or of the mobile electronic device 18 (which may receive the images and/or videos captured by the camera 12 via a communication network) may analyze the images and/or videos and determine that the vehicle 10 is within a threshold distance of another vehicle or other object, which may be indicative of the vehicle 10 being in a traffic incident.

Figure 2:
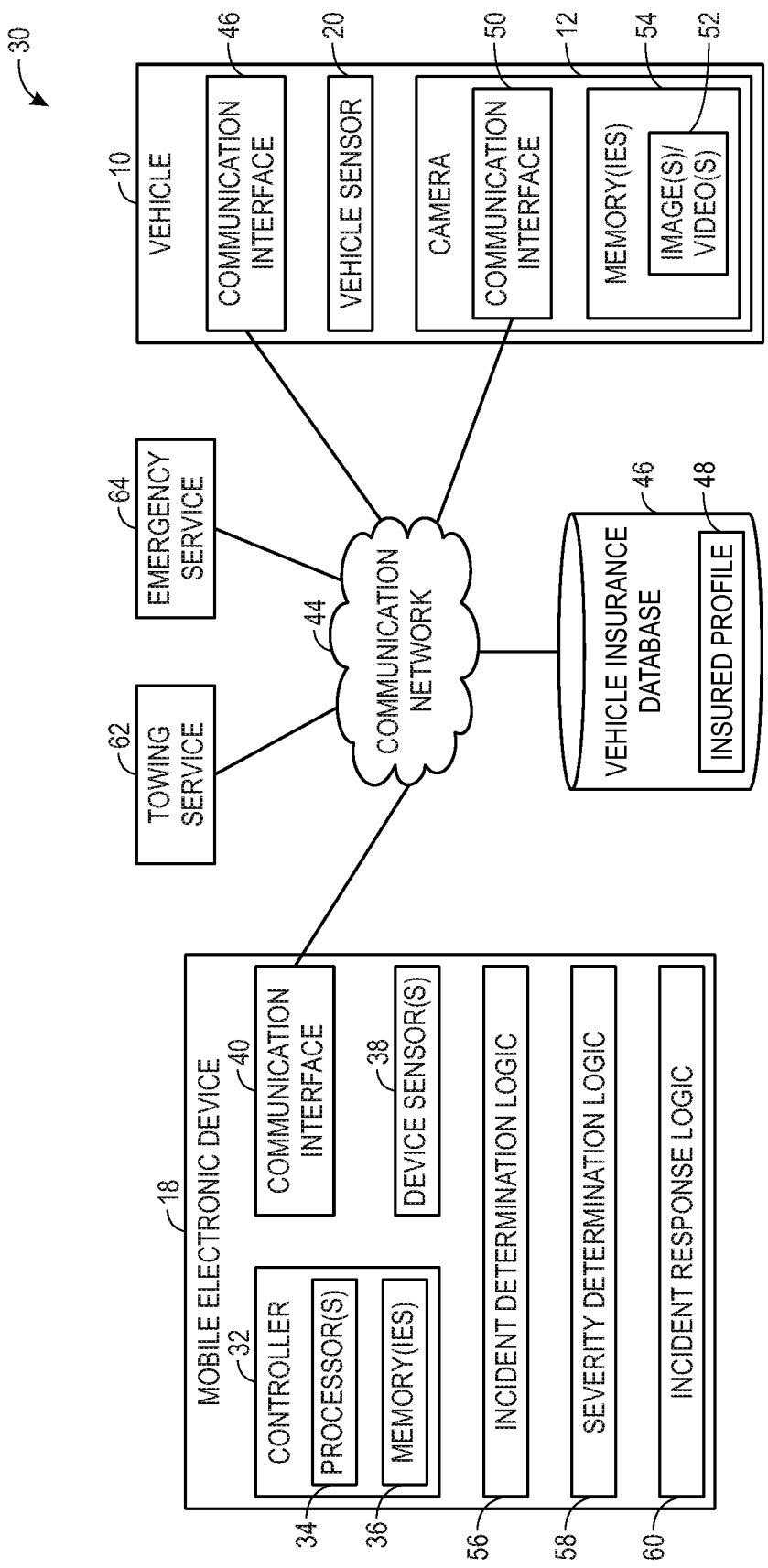
FIG. 2 is a block diagram of a traffic incident detection and response system including the vehicle of FIG. 1, according to embodiments of the present disclosure.

FIG. 2 is a block diagram of a traffic incident detection and response system 30, according to embodiments of the present disclosure. As illustrated, the traffic incident detection and response system 30 includes the mobile electronic device 18 and the vehicle 10. The mobile electronic device 18 may include a controller 32 that includes one or more processors 34 and one or more memory and/or storage devices 36. The one or more processors 34 (e.g., microprocessors) may execute software programs and/or instructions to facilitate determining a likelihood and/or a severity of a traffic incident, and/or responding to a traffic incident. Moreover, the one or more processors 34 may include multiple microprocessors, one or more "general-purpose" microprocessors, one or more special-purpose microprocessors, and/or one or more application specific integrated circuits (ASICS), or some combination thereof. For example, the one or more processors 34 may include one or more reduced instruction set (RISC) processors. The one or more memory devices 36 may store information such as control software, look up tables, configuration data, etc. In some embodiments, the one or more processors 34 and/or the one or more memory devices 36 may be external to the controller 32. The one or more memory devices 36 may include a tangible, non-transitory, machine-readable-medium, such as a volatile memory (e.g., a random access memory (RAM)) and/or a nonvolatile memory (e.g., a read-only memory (ROM)). The one or more memory devices 36 may store a variety of information and may be used for various purposes. For example, the one or more memory devices 36 may store machine-readable and/or processor-executable instructions (e.g., firmware or software) for the one or more processors 34 to execute, such as instructions for determining a likelihood and/or a severity of a traffic incident, and/or responding to a traffic incident. The one or more memory devices 36 may include one or more storage devices (e.g., nonvolatile storage devices) that may include read-only memory (ROM), flash memory, a hard drive, or any other suitable optical, magnetic, or solid-state storage medium, or a combination thereof. While the controller 32 is illustrated as a component of the mobile electronic device 18, in some embodiments, at least a portion of the controller 32 may be separate from and external to the mobile electronic device 18. For example, the controller 32 may be part of the vehicle 10, the camera 12, and/or any other suitable electronic device. In one embodiment, the controller 32 may include multiple controllers, such as a first controller in the camera 12 that may control operations of the camera 12 and determine whether a traffic incident has occurred based on images and/or videos captured by the camera, and a second controller in the mobile electronic device 18 that performs traffic incident response actions based on the first controller determining that the traffic incident has occurred.

As illustrated, the mobile electronic device 18 may include the one or more device sensors 38 that detect one or more operational characteristics of the vehicle 10 that may facilitate determining whether the vehicle 10 has been in a traffic incident. Examples of the one or more device sensors 38 may include accelerometers, gyroscopes, magnetometers, location sensors (e.g., that use global positioning system (GPS) technology), or any other sensor that may detect acceleration and/or speed of the vehicle 10.

The mobile electronic device 18 and the vehicle 10 may include respective communication interfaces 40, 42 that enable the mobile electronic device 18 and the vehicle 10 to communicatively couple to other devices via a communication network 44. The communication network 44 may enable communication via any suitable communication protocol, such as a wireless communication protocol (e.g., associated with mobile communication, WiFi, LAN, WAN, the Internet, telephone service, and the like) and/or a wired communication protocol. For example, the communication interface 40 may enable the controller 32 of the mobile electronic device 18 to communicate with a vehicle bus of the vehicle 10 (e.g., controller area network (CAN) bus) via the communication network 44. The vehicle bus may receive a variety of sensor data from the various vehicle sensors 20 of the vehicle 10. In this manner, the controller 32 may receive sensor data from the one or more vehicle sensors 20 of the vehicle 10.

The communication interfaces 40, 42 may also enable the mobile electronic device 18 and the vehicle 10 to communicate with third parties. For example, the communication interfaces 40, 42 may enable the mobile electronic device 18 and the vehicle 10, respectively, to communicate with servers and/or other computing resources of insurance companies, emergency services, law enforcement agencies, and the like, via the communication network 44, to send or receive information, such as providing alerts related to a traffic incident.

The communication interfaces 40, 42 may enable the mobile electronic device 18 and the vehicle 10, respectively, to communicate with a vehicle insurance database or risk management 46 of an insurance company (e.g., that insures an approved driver of the vehicle 10) via the communication network 44. The vehicle insurance database 46 may store insured profiles 48 that correspond to people that are insured by the insurance company. An insured profile 48 may include any suitable information that may facilitate providing insurance to the insured, such as the insured's name, address, insurance premium, type of insurance coverage, amount of insurance coverage, cost of insurance, insurance plan, driving history, criminal history, type or characteristics of the vehicles covered (e.g., including make, model, model year, color, body style, driving number of seats, safety features, number of seatbelts), maintenance history of the vehicle 10, family members, names and ages of family members, and so on. The data stored the insured profile 48 may include risk data and/or risk management data, and may facilitate assessing risk management for the insured. As such, the communication interface 40 may enable the controller 32 of the mobile electronic device 18 to receive any information of the insured profile 48 from the vehicle insurance database 46 via the communication network 44.

While the vehicle 10 is illustrated as including the camera 12, the camera 12 may be internal to, external to, or separate from the vehicle 10. For example, the camera 12 may be mounted to an internal component of the vehicle 10 (e.g., the dashboard 16, the rear-view mirror 14), an external component of the vehicle 10 (e.g., a door, a hood), or be handheld. In any case, the camera 12 may include a communication interface 50 that also enables the camera 12 to communicate with the communication network 44. The camera 12 may also capture images and/or videos 52, which may be stored in one or more memory or storage devices 54 of the camera 12. As such, the controller 32 of the mobile electronic device 18 may receive the images and/or videos 52 from the memory device 54 of the camera 12 via the communication network 44.

As illustrated, the mobile electronic device 18 includes incident determination logic 56 (e.g. circuitry and/or software) that facilitates determining whether a traffic incident occurred by determining a likelihood of whether the traffic incident occurred. In particular, the incident determination logic 56 may receive sensor information from the device sensors 38 of the mobile electronic device 18, sensor information from the vehicle sensors 20 of the vehicle 10 via the communication network 44, and/or the images/videos 52 from the camera 12 via the communication network 44, and determine a likelihood of whether the traffic incident occurred based on the sensor information.

For example, the incident determination logic 56 may receive sensor information from a device sensor 38 and determine that the sensor information indicates that the vehicle 10 has undergone excessive deceleration, which may be indicative of a traffic incident. Similarly, the incident determination logic 56 may receive sensor information from a vehicle sensor 20 via the communication network 44 and determine that the sensor information indicates that the vehicle 10 has undergone excessive deceleration, component damage, component operational failure, structural damage, operational parameters (e.g., temperature, pressure) outside of a threshold range, and so on, which may be indicative of a traffic incident. In some cases, the incident determination logic 56 may receive images and/or videos 52 captured by the camera 12 via the communication network 44 near the time of the possible traffic incident, and analyze the images and/or videos 52 determine that there are indications of the vehicle 10 having been in a traffic incident. For example, the incident determination logic 56 may analyze the image and/or video data and determine that the vehicle 10 is within a threshold distance of another vehicle or other object, which may be indicative of the vehicle 10 being in a traffic incident.

In some embodiments, a likelihood of an actual traffic incident is based on a correlation between the images/videos 52 obtained from the camera 12 and otherwise acquired data, such as that obtained from the vehicle sensor 20. For example, for a threshold of likelihood to be met, the incident determination logic 56 may require that both the images/videos 52 and the otherwise acquired data both be indicative of a traffic incident within a same timeframe. In some embodiments, the incident determination logic 56 may not analyze the images/videos 52 until a threshold value associated with other sensor data is met. For example, before obtaining or analyzing the images/videos 52 from the camera 12, the incident determination logic 56 may require that the vehicle sensor 20 provide data that exceeds a threshold (e.g., a deceleration rate greater than a set or relative value). Analyzing the images/videos 52 from the camera 12 may require substantial processing time. Accordingly, by limiting such processing (e.g., limiting data analysis based on a sensor value's relationship to a threshold), present embodiments improve operation of the related computer (e.g., the processor 34) and increase efficiency of operation. Moreover, in some embodiments, analysis of the images/videos 52 may occur in other devices than the mobile electronic device 18, such as the vehicle 10, or any other suitable electronic device.

In some embodiments, the incident determination logic 56 may use machine learning algorithms to determine a likelihood of whether the traffic incident occurred. That is, the incident determination logic 56 may build a mathematical model by receiving sample data (e.g., in the form of the sensor information from the device sensors 38 of the mobile electronic device 18, the sensor information from the vehicle sensors 20 of the vehicle 10, and/or the images/videos 52 from the camera 12), predicting whether a traffic incident has occurred based on the sample data, and learning whether the prediction was true or false. The incident determination logic 56 may then apply the mathematical model to the sensor information from the device sensors 38 of the mobile electronic device 18, the sensor information from the vehicle sensors 20 of the vehicle 10, and/or the images/videos 52 from the camera 12, and determine a likelihood of whether the traffic incident occurred.

In particular, the incident determination logic 56 may generate a traffic incident likelihood as a score or percentage, and may compare the traffic incident likelihood to a traffic incident likelihood threshold, also represented as a score or percentage. The traffic incident likelihood threshold may be any suitable likelihood that indicates that the traffic incident occurred (e.g., 30-80%, 40-60%, 50%, 75%, 33%). If the traffic incident likelihood is greater than or equal to the traffic incident likelihood threshold, then the incident determination logic 56 may determine that a traffic incident has occurred. Otherwise, if the traffic incident likelihood is less than the traffic incident likelihood threshold, then the incident determination logic 56 may determine that a traffic incident has not occurred. In some embodiments, the incident determination logic 56 may receive a combination of the types of sensor information discussed above, and use a weighting system or algorithm to assign a weight to each type of sensor information (e.g., based on reliability of the type of sensor information or how indicative the type of sensor information is regarding determining a traffic incident). In cases where the incident determination logic 56 uses machine learning algorithms, the incident determination logic 56 may also assign a weight to the prediction made using the machine learning algorithms. The incident determination logic 56 may then generate the traffic incident likelihood based on applying the weights to each type of sensor information and/or the prediction made using the machine learning algorithms.

The mobile electronic device 18 also includes severity determination logic 58 that determines the severity of a determined traffic incident. In particular, the severity determination logic 58 may receive information in the insured profile 48 from the vehicle insurance database 46 via the communication network 44, data captured at or near the time of the traffic incident (e.g., the time of day, the date, the weather, the location, and so on) via the communication network 44, the images/videos 52 from the camera 12 via the communication network 44, sensor information from the device sensors 38 of the mobile electronic device 18, and/or sensor information from the vehicle sensors 20 of the vehicle 10 via the communication network 44, and determine the severity of a traffic incident based on the information in the insured profile 48 and/or the images/videos 52 from the camera 12. In some cases, the severity determination logic 58 may not be initiated until the incident determination logic 56 suggests a certain likelihood of a traffic incident occurring, which may save processing time and make the related computer more efficient. Further, the severity determination logic 58 may limit analysis of data from the camera 12 within the severity determination logic 56 to save processing time in a manner such as that described above with respect to the incident determination logic 56.

For example, the severity determination logic 58 may receive the information in the insured profile 48 and determine that the information indicates that the vehicle 10 is a sports car, is an older vehicle that does not have modern safety features, and/or that younger children and/or senior citizens may typically be in the vehicle 10, and so on, which may be indicative of a traffic incident with higher severity. As another example, the severity determination logic 58 may receive data captured at or near the time of the traffic incident, and determine that the data indicates that the time of day is associated with a reduced field of vision and/or when people are typically asleep and less alert (e.g., nighttime or early morning), the date is associated with high traffic (e.g., a holiday), the time of day is associated with high traffic (e.g., rush hour), the weather is associated with slippery roads or a reduced field of vision (e.g., rain, sleet, snow), the location (e.g., as determined via a location sensor of the mobile electronic device 18) is associated with a higher degree of danger (e.g., a mountainside road, a bridge, an intersection where traffic incidents commonly occur), and the like, which may be indicative of the traffic incident having higher severity. As yet another example, the severity determination logic 58 may receive the images/videos 52 from the camera 12, and determine that the images/videos 52 display an excessive spin velocity or acceleration, display the vehicle 10 within a threshold distance of another vehicle or other object, and so on, which may be indicative of the traffic incident having higher severity. In another example, the severity determination logic 58 may receive the sensor information from the device sensors 38 of the mobile electronic device 18 and/or the sensor information from the vehicle sensors 20 and determine that the sensor information indicates that the vehicle 10 was traveling at an excessive speed prior to the traffic incident, which may be indicative of the traffic incident having higher severity.

The severity determination logic 58 may generate a traffic incident severity as a score or percentage, and may scale the traffic incident severity based on the score. For example, a score or percentage of 0-33 may indicate a traffic incident with low severity, a score or percentage of 34-66 may indicate a traffic incident with medium severity, and a score or percentage of 67-100 may indicate a traffic incident with high severity. It should be understood that any suitable scale and/or grade for each scale range is contemplated, such as ranking severity as letter grades A-F.

In some embodiments, the severity determination logic 58 may use machine learning algorithms to determine the severity of a traffic incident. That is, the severity determination logic 58 may build a mathematical model by receiving sample data (e.g., in the form of the information in the insured profile 48 from the vehicle insurance database 46, data captured at or near the time of the traffic incident, the images/videos 52 from the camera 12, the sensor information from the device sensors 38 of the mobile electronic device 18, and/or the sensor information from the vehicle sensors 20), predicting the severity of a traffic incident based on the sample data, and learning whether the prediction was true or false. The severity determination logic 58 may then apply the mathematical model to the information in the insured profile 48 from the vehicle insurance database 46, data captured at or near the time of the traffic incident, the images/videos 52 from the camera 12, the sensor information from the device sensors 38 of the mobile electronic device 18, and/or the sensor information from the vehicle sensors 20, and determine the severity of the traffic incident.

The severity determination logic 58 may receive a combination of the types of information discussed above, and use a weighting system or algorithm to assign a weight to each type of information (e.g., based on reliability of the type of information or how indicative the type of information is regarding determining the severity a traffic incident). In cases where the severity determination logic 58 uses machine learning algorithms, the severity determination logic 58 may also assign a weight to the prediction made using the machine learning algorithms. The severity determination logic 58 may then generate the traffic incident severity based on applying the weights to each type of information and/or the prediction made using the machine learning algorithms.

The mobile electronic device 18 also includes incident response logic 60 that facilitates responding to a determination that a traffic incident has occurred and/or the severity of the traffic incident. For example, if the incident determination logic 56 determines that a traffic incident has occurred (e.g., such that the likelihood of the traffic incident exceeds a traffic incident likelihood threshold), then the incident response logic 60 may send a request to a vehicle assistance service for help. In some embodiments, the incident response logic 60 may receive information of the insured profile 48 from the vehicle insurance database 46 via the communication network 44, determine the insurer of the driver of the vehicle 10, and determine a towing service 62 or tow truck company near (e.g., within a threshold distance) or nearest to the traffic incident (e.g., based on the location of the mobile electronic device 18 as determined by a location sensor) whose services are covered by the insurer via the communication network 44. The incident response logic 60 may then prompt the driver (e.g., via a text, audio, or video prompt using a display and/or speakers of the mobile electronic device 18) as to whether the driver wants a request to be sent to the towing service 62. Based on the driver's answer (e.g., as received via a touch indication on a touchscreen display of the mobile electronic device 18 or vocal or visual indication received by a microphone and/or a camera of the mobile electronic device 18), the incident response logic 60 may send the request to the towing service 62 via the communication network 44. While a towing service 62 is described in the present disclosure, it should be understood that the towing service 62 is an illustrative example of any suitable assistance service that may be contacted in case of a traffic incident, including an auto insurance response service, a law enforcement service, a rental car company service, and so on.

In some embodiments, the incident response logic 60 may send the request to the towing service 62 without prompting by the driver (e.g., as an option set by the driver). In one embodiment, the incident response logic 60 may prompt the driver whether the request should be sent to the towing service 62, but may send the request to the towing service 62 without confirmation by the driver after a time threshold (e.g., one to ten minutes, two minutes, five minutes, or any other suitable duration of time) has been reached, as the driver may have been injured in the traffic incident and may not be able to respond to the prompt, the mobile electronic device 18 may have been damaged in the traffic incident and may not be able to receive certain inputs, and so on.

As an additional or alternative example, if the severity determination logic 58 determines that the traffic incident is at or exceeds a certain severity, then the incident response logic 60 may send a request to an emergency service 64 for help via the communication network 44. For example, if the severity determination logic 58 determines that the severity of the traffic incident is a certain level (e.g., high, medium, grade A, and so on) and/or exceeds a threshold severity (e.g., 75% or any other suitable threshold severity), then the incident response logic 60 may cause the communication interface 40 of the mobile electronic device 18 to dial 911.

In some embodiments, the severity determination logic 58 may receive information of the insured profile 48 from the vehicle insurance database 46 via the communication network 44, determine the insurer of the driver of the vehicle 10, and determine an emergency service 64 near (e.g., within a threshold distance) or nearest to the traffic incident (e.g., based on the location of the mobile electronic device 18 as determined by a location sensor) whose services are covered by the insurer via the communication network 44. The incident response logic 60 may then prompt the driver (e.g., via a text, audio, or video prompt using a display and/or speakers of the mobile electronic device 18) as to whether the driver wants a request to be sent to the emergency service 64. Based on the driver's answer (e.g., as received via a touch indication on a touchscreen display of the mobile electronic device 18 or vocal or visual indication received by a microphone and/or a camera of the mobile electronic device 18), the incident response logic 60 may send the request to the emergency service 64 via the communication network 44.

In some embodiments, the incident response logic 60 may send the request to the emergency service 64 without prompting by the driver (e.g., as an option set by the driver). In one embodiment, the incident response logic 60 may prompt the driver whether the request should be sent to the emergency service 64, but may send the request to the emergency service 64 without confirmation by the driver after a time threshold (e.g., one to ten minutes, two minutes, five minutes, or any other suitable duration of time) has been reached, as the driver may have been injured in the traffic incident and may not be able to respond to the prompt, the mobile electronic device 18 may have been damaged in the traffic incident and may not be able to receive certain inputs, and so on.

Moreover, in some embodiments, whether a prompt should be presented to the driver and/or whether confirmation should be received before sending the request to the emergency service 64 may be determined based on the severity. For example, if the severity determination logic 58 determines the severity is low, the incident response logic 60 may prompt the driver whether the request should be sent to the emergency service 64, and may not send the request unless confirmed by the driver. If the severity determination logic 58 determines the severity is medium, the incident response logic 60 may prompt the driver whether the request should be sent to the emergency service 64, and may send the request within a time threshold (e.g., two minutes), even if the request is not confirmed. If the severity determination logic 58 determines the severity is high, the incident response logic 60 may immediately send the request without prompting the driver, as immediate emergency care may be needed or desired.

In some embodiments, the incident response logic 60 may send varying levels of notice to an assistance service (e.g., the towing service 62 or the emergency service). For example, upon initial consideration of sensor data (e.g., deceleration data or camera data) for the vehicle 10, an initial notice may be sent to assistance service vehicles or offices within a threshold distance from the vehicle 10. This may put the assistance services on alert and allow for preparation to assist. Once the data is more thoroughly analyzed, more specific information about the possible traffic incident may be provided to the assistance service based on operation of the response logic 60. As a specific example, the incident response logic 60 may broadcast an initial traffic incident assessment that includes a location and likelihood value for the need of towing to approved tow trucks within a radius of the vehicle 10 at the time of the possible traffic incident. Once a severity diagnosis is made by the severity determination logic 58, even more specific information may be provided that allows for appropriate preparations or decision making. For example, a secondary notice may provide that the front of the vehicle 10 is not functional and/or that the likelihood of the traffic incident has increased to 99%. This may result in operational efficiency of the mobile electronic device 18 and/or a system or network of communicatively coupled computers by conserving processing requirements and distributing them according to a hierarchy of data importance within timeframes relevant to the incident.

In some cases, the incident response logic 60 may automatically generate and submit an insurance claim with the insurance company (e.g., that insures a driver of the vehicle 10) based on the insured profile 48 from the vehicle insurance database 46. The incident response logic 60 may provide any information for the insurance claim based on the insured profile 48, the sensor information from the device sensors 38 of the mobile electronic device 18, the sensor information from the vehicle sensors 20 of the vehicle 10, and/or the images/videos 52 from the camera 12. The controller 32 may enable the driver to authenticate and/or confirm the insurance claim before submission. The incident response logic 60 may then submit the insurance claim.

While the incident determination logic 56, the severity determination logic 58, and the incident response logic 60 are illustrated as being separate or external to the controller 32, it should be understood that, in some embodiments, the controller 32 may include the incident determination logic 56, the severity determination logic 58, and/or the incident response logic 60 of the mobile electronic device 18. Additionally, the term "logic" as used herein may include software (e.g., instructions executable by a processor, such as the processor 34), hardware (e.g., circuitry), or a combination of the two. In this manner, the system 30 may determine a likelihood and/or a severity of a traffic incident, and respond to the traffic incident.

Figure 3:
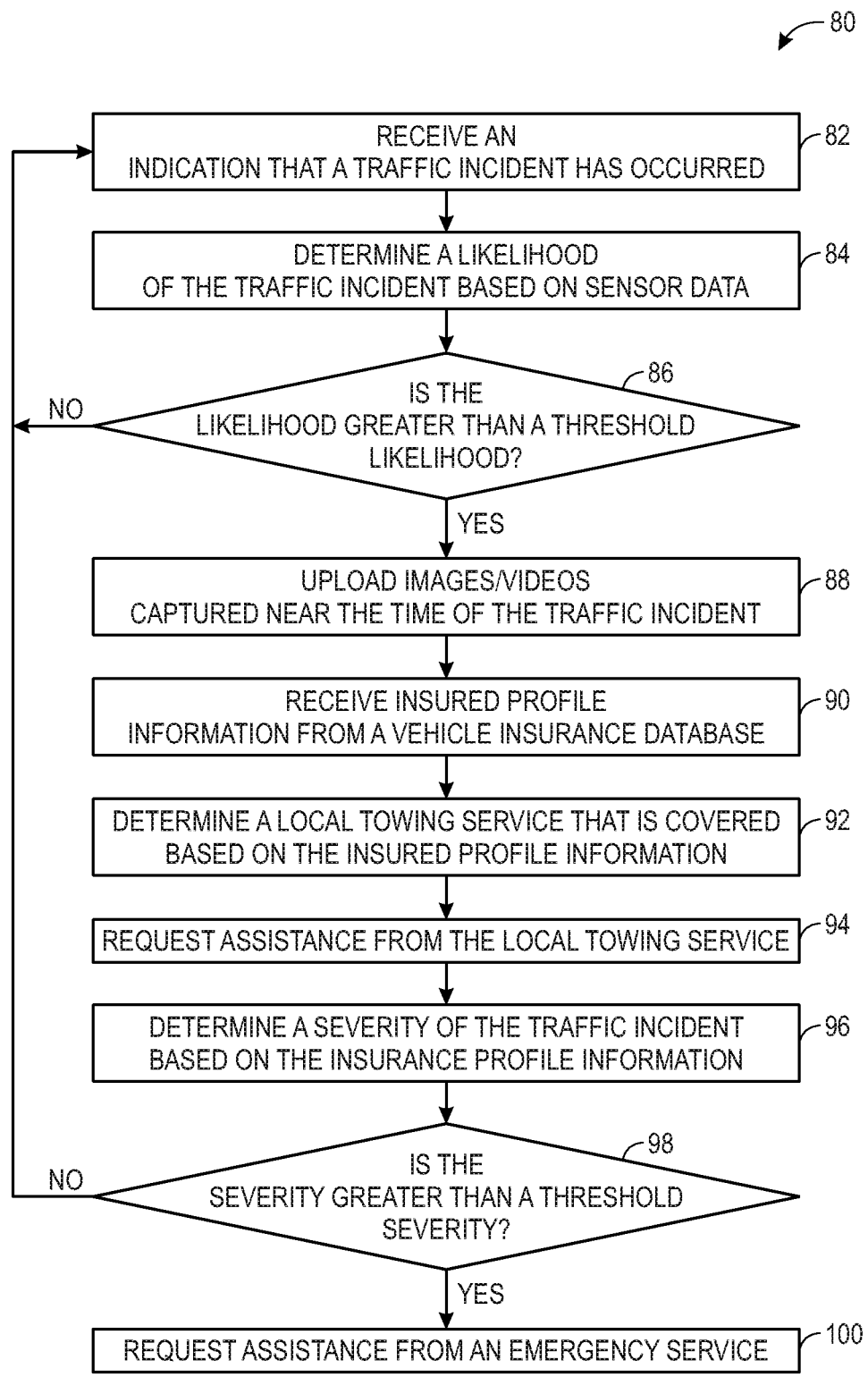
FIG. 3 is a flowchart illustrating a method for determining a likelihood and a severity of a traffic incident, and responding to the traffic incident, which may be performed by the traffic incident detection and response system of FIG. 2, according to embodiments of the present disclosure.

With this in mind, FIG. 3 is a flowchart illustrating a method 80 for determining a likelihood and a severity of a traffic incident, and responding to the traffic incident, according to embodiments of the present disclosure. The method 80 may be performed by any suitable device that may control components of the traffic incident detection and response system 30 of FIG. 2, such as the controller 32, the incident determination logic 56, the severity determination logic 58, and/or the incident response logic 60 of the mobile electronic device 18. While the method 80 is described using steps in a specific sequence, it should be understood that the present disclosure contemplates that the described steps may be performed in different sequences than the sequence illustrated, and certain described steps may be skipped or not performed altogether. In some embodiments, the method 80 may be implemented by executing instructions stored in a tangible, non-transitory, computer-readable medium, such as the one or more memory devices 36, using a processor, such as the one or more processors 34.

As illustrated, in process block 82, the incident determination logic 56 receives an indication that a traffic incident has occurred. In particular, the incident determination logic 56 may receive sensor information from the device sensors 38 of the mobile electronic device 18, sensor information from the vehicle sensors 20 of the vehicle 10 via the communication network 44, and/or the images/videos 52 from the camera 12 via the communication network 44, that is indicative of a traffic incident having occurred.

In process block 84, the incident determination logic 56 determines a likelihood of the traffic incident based on sensor data. That is, the incident determination logic 56 may determine the likelihood of the traffic incident based on the sensor information from the device sensors 38 of the mobile electronic device 18, the sensor information from the vehicle sensors 20 of the vehicle 10 via the communication network 44, and/or the images/videos 52 from the camera 12 via the communication network 44. In particular, the incident determination logic 56 may generate a score or percentage representing the likelihood of the traffic incident based on the sensor data. In some embodiments, the incident determination logic 56 may use machine learning algorithms to determine the likelihood of the traffic incident.

In decision block 86, the incident determination logic 56 determines whether the likelihood is greater than a threshold likelihood. The threshold likelihood may be any suitable likelihood that indicates the traffic incident occurred (e.g., 30-80%, 40-60%, 50%, 75%, 33%). If the incident determination logic 56 determines that the likelihood is not greater than the threshold likelihood, then the method 80 starts over, and the incident determination logic 56 repeats process block 82.

If the incident determination logic 56 determines that the likelihood is greater than the threshold likelihood, then, in process block 88, the controller 32 uploads images/videos 52 captured by the camera 12 near the time of the traffic incident. For example, the controller 32 may determine a time of the traffic incident, and send a request to the camera 12 for images and/or videos 52 captured within a threshold time (e.g., 1 second to 10 minutes, 2-60 seconds, five seconds, ten seconds, two seconds) of the time of the traffic incident, via the communication network 44. The controller 32 may upload the images and/or videos 52 captured within the threshold time via the communication network 44. In some cases, the controller 32 may further upload the images and/or videos 52 to a third party (e.g., to a remote system or external device of the third party), such as the vehicle insurance database 46, a law enforcement agency, and so on, via the communication network 44.

In one embodiment, the controller 32, which may be, at least in part, disposed in the camera 12, may determine that the likelihood is greater than the threshold likelihood, and upload the captured images/videos 52 to the mobile electronic device 18. The portion of the controller 32 disposed in the mobile electronic device 18 may detect that the images/videos 52 have been uploaded by the camera 12, indicating that the images/videos 52 may be indicative of a traffic incident, and instruct the incident response logic 60 to upload the images/videos 52 to the insurance company (e.g., that insures a driver of the vehicle 10) based on the insured profile 48 from the vehicle insurance database 46 to, for example, submit an insurance claim. The incident response logic 60 may provide any information for the insurance claim based on the insured profile 48, the sensor information from the device sensors 38 of the mobile electronic device 18, the sensor information from the vehicle sensors 20 of the vehicle 10, and/or the images/videos 52 from the camera 12. The controller 32 may enable the driver to authenticate and/or confirm the insurance claim before submission. The incident response logic 60 may then submit the insurance claim.

In process block 90, the severity determination logic 58 receives insured profile information from the vehicle insurance database 46. In particular, the severity determination logic 58 may send a request for information in the insured profile 48 of the driver of the vehicle 10 involved in the traffic incident to the vehicle insurance database 46 via the communication network 44. The information may include any suitable information associated with services covered by the insurer (e.g. vehicle assistance and/or emergency services), as well as any suitable information that facilitates determining severity of the traffic incident, such as the make of the vehicle 10, the model of the vehicle 10, the model year of the vehicle 10, the body style of the vehicle 10, the number of seats of the vehicle 10, the safety features of the vehicle 10, a number of family members of the driver, ages of the family members of the driver, and so on.

In process block 92, the incident response logic 60 determines a local towing service 62 that is covered based on the insured profile information. In particular, the incident response logic 60 may determine a location that the traffic incident occurred using, for example, a location sensor of the mobile electronic device 18. The incident response logic 60 may then determine a towing service 62 within a threshold distance of the traffic incident (e.g., 0-25 miles, ten miles, five miles, two miles, one mile) that is covered by the insurer provided in the insured profile information. In some cases, if the incident response logic 60 determines that there is no covered towing service 62 within the threshold distance, then the incident response logic 60 may increase the threshold distance to determine whether there is a covered towing service 62 and/or determine a towing service that is not covered by the insurer within the threshold distance.

In process block 94, the incident response logic 60 requests assistance from the local towing service 62. That is, the incident response logic 60 may use the communication interface 40 to call or send a message (e.g., a text message, email) to the local towing service 62 requesting towing at the location of the traffic incident. In some cases, the incident response logic 60 may prompt the driver as to whether the driver wants a request to be sent to the towing service 62. Based on the driver's answer, the incident response logic 60 may send the request to the towing service 62 via the communication network 44. Additionally or alternatively, the incident response logic 60 may send the request to the towing service 62 without prompting by the driver, for example, after a time threshold has been reached, as the driver may have been injured in the traffic incident and may not be able to respond to the prompt, the mobile electronic device 18 may have been damaged in the traffic incident and may not be able to receive certain inputs, and so on.

In process block 96, the severity determination logic 58 determines a severity of the traffic incident based on the insured profile information. For example, the severity determination logic 58 may determine the severity based on the make, model, model year, body style, the safety features of the vehicle 10, and so on, which may be indicative of safety and/or reliability of the vehicle 10. The severity determination logic 58 may additionally or alternatively determine the severity based on the number of seats of the vehicle 10, a number of family members of the driver, ages of the family members of the driver, and so on, which may be indicative of the effect of the traffic incident on physically weaker family members. Moreover, in some embodiments, the severity determination logic 58 may determine the severity based on data captured at or near the time of the traffic incident, such as the time of day, the date, the weather, the location, and the like, which may be indicative of the traffic incident having higher severity. The severity determination logic 58 may also or alternatively receive the images/videos 52 from the camera 12 and determine that the images/videos 52 display spin velocity or acceleration, a threshold distance of the vehicle 10 to another vehicle or other object, and so on, which may be indicative of the traffic incident having higher severity. As another example, the severity determination logic 58 may receive the sensor information from the device sensors 38 of the mobile electronic device 18 and/or the sensor information from the vehicle sensors 20 indicative of an excessive speed of the vehicle 10 prior to the traffic incident on, which may be indicative of the traffic incident having higher severity. The severity determination logic 58 may use any one of these sources of information or any combination of these sources of information to determine the severity of the traffic incident.

In decision block 98, the severity determination logic 58 determines whether the severity of the traffic incident is greater than a threshold severity. In some embodiments, the threshold severity may be any suitable severity that indicates emergency services 64 (e.g., paramedics, firefighters, law enforcement officials, and so on) are needed or desirable, such as 50-100%, 70-80%, 60%, 75%, 85%). If the severity determination logic 58 determines that the severity is not greater than the severity likelihood, then the method 80 starts over, and the severity determination logic 58 repeats process block 82.

If the severity determination logic 58 determines that the severity of the traffic incident is greater than the threshold severity, then, in process block 100, the incident response logic 60 requests assistance from an emergency service 64. For example, the severity determination logic 58 may receive information of the insured profile 48 from the vehicle insurance database 46 via the communication network 44, determine the insurer of the driver of the vehicle 10, and determine an emergency service 64 near (e.g., within a threshold distance) or nearest to the traffic incident whose services are covered by the insurer via the communication network 44. The incident response logic 60 may then prompt the driver as to whether the driver wants a request to be sent to the emergency service 64. Based on the driver's answer, the incident response logic 60 may send the request to the emergency service 64 via the communication network 44.

In some embodiments, the incident response logic 60 may send the request to the emergency service 64 without prompting by the driver. In one embodiment, the incident response logic 60 may prompt the driver whether the request should be sent to the emergency service 64, but may send the request to the emergency service 64 without confirmation by the driver after a time threshold has been reached, as the driver may have been injured in the traffic incident and may not be able to respond to the prompt, the mobile electronic device 18 may have been damaged in the traffic incident and may not be able to receive certain inputs, and so on. Moreover, whether a prompt should be presented to the driver and/or whether confirmation should be received before sending the request to the emergency service 64 may be determined based on the severity (e.g., comparing the severity to different severity thresholds). In particular, the severity determination logic 58 may determine if the severity is suitably high (e.g., greater than a higher threshold severity) and, if so, the incident response logic 60 may immediately send the request without prompting the driver, as immediate emergency care may be needed or desired. In this manner, the method 80 may determine a likelihood and a severity of a traffic incident, and respond to the traffic incident.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A vehicular incident detection and management system, comprising:
    a sensor configured to detect an operational characteristic of a vehicle;
    a communication interface configured to receive operational data indicative of the operational characteristic from the sensor, and receive risk management data associated with the vehicle from a database, wherein the risk management data comprises physical characteristics of the vehicle or an age of the vehicle;
    one or more processors; and
    one or more memory devices storing instructions that, when executed by the one or more processors, cause the one or more processors to:
        identify that the vehicle has had a potential incident and a probability that the potential incident has actually occurred based on analysis of the operational data;
        determine a severity level for the potential incident based on the operational data and the physical characteristics of the vehicle or the age of the vehicle; and
        send a notification indicative of the potential incident based on the probability and the severity level to a remote system via the communication interface.

2. The vehicular incident detection and management system of claim 1, wherein the sensor is integrated with a portable device and wherein the system comprises a vehicle sensor integrated with the vehicle, the vehicle sensor configured to detect an additional operational characteristic of the vehicle and to generate additional operational data indicative of the additional operational characteristic.

3. The vehicular incident detection and management system of claim 2, comprising a camera.

4. The vehicular incident detection and management system of claim 3, wherein the instructions, when executed by the one or more processors, cause the one or more processors to initiate image capture by the camera.

5. The vehicular incident detection and management system of claim 4, wherein the instructions, when executed by the one or more processors, cause the one or more processors to determine the probability that the potential incident has actually occurred or the severity level based on the operational data, the additional operational data, and one or more images or videos captured by the camera.

6. The vehicular incident detection and management system of claim 1, wherein the operational characteristic including a change to a crumple zone of the vehicle, a speed of the vehicle, an acceleration of the vehicle, changing direction of travel of the vehicle, or any combination thereof.

7. The vehicular incident detection and management system of claim 6, wherein the instructions, when executed by the one or more processors, cause the one or more processors to determine an increased probability that the potential incident has actually occurred when the acceleration indicates that the vehicle decelerated beyond a threshold acceleration value.

8. The vehicular incident detection and management system of claim 1, wherein the risk management data comprises a maintenance history of the vehicle, and the instructions, when executed by the one or more processors, cause the one or more processors to determine the severity level for the potential incident based on the maintenance history.

9. The vehicular incident detection and management system of claim 1, wherein the risk management data comprises an indication of seatbelts in the vehicle, and the instructions, when executed by the one or more processors, cause the one or more processors to determine the severity level for the potential incident based on the seatbelts in the vehicle.

10. The vehicular incident detection and management system of claim 1, wherein the instructions, when executed by the one or more processors, cause the one or more processors to provide an initial communication to the remote system based on the probability that the potential incident has actually occurred exceeding a probability threshold and subsequently provide the notification based on the severity level for the potential incident exceeding a severity threshold.

11. The vehicular incident detection and management system of claim 1, wherein the communication interface is communicatively coupled with a camera and wherein the instructions, when executed by the one or more processors, cause the one or more processors to determine the probability that the potential incident has actually occurred, the severity level for the potential incident, or both, based on one or more images or videos captured by the camera.

12. The vehicular incident detection and management system of claim 1, comprising a camera configured to capture image data, wherein the instructions, when executed by the one or more processors, cause the image data to be uploaded to the remote system in response to the probability that the potential incident has actually occurred exceeding a threshold value.

13. The vehicular incident detection and management system of claim 1, comprising a vehicle bus configured to communicatively couple the communication interface with the sensor, a camera, and an additional sensor configured to detect an additional operational characteristic of the vehicle.

14. The vehicular incident detection and management system of claim 1, wherein the notification includes location data or mapping information to facilitate routing an emergency services vehicle to the vehicle.

15. One or more tangible, non-transitory, computer-readable media storing instructions that, when executed by one or more processors, cause the one or more processors to:

determine that a vehicle has had a potential traffic incident and a probability that the potential traffic incident was an actual traffic incident based on one or more operational characteristics of the vehicle received from one or more device sensors of an electronic device, vehicle sensor information received from one or more vehicle sensors, one or more images or videos captured by a camera, or any combination thereof;

determine a severity level of the potential traffic incident based on risk data stored in a risk management database, the images or the videos captured by the camera, or any combination thereof, wherein the risk data comprises a driving history of an approved driver of the vehicle and a maintenance history of the vehicle; and send a request for assistance to a third party based on the probability that the potential traffic incident has actually occurred, the severity level of the potential traffic incident, or any combination thereof.

16. The one or more tangible, non-transitory, computer-readable media of claim 15, wherein the risk data comprises one or more characteristics of the vehicle.

17. The one or more tangible, non-transitory, computer-readable media of claim 16, wherein the instructions cause the one or more processors to increase a value of the severity level based on the one or more characteristics of the vehicle indicating an older model of the vehicle.

18. A method comprising:
determining, via a processor of an electronic device, that a vehicle has had a potential incident and a probability that the potential incident has actually occurred based on operational characteristics of the vehicle received from one or more vehicle sensors of the vehicle, one or more device sensors of an electronic device, one or more images or videos captured by a camera of the vehicle or the electronic device, or any combination thereof;

determining, via the processor, a severity for the potential incident based on risk data stored in a database and the operational characteristics of the vehicle, wherein the risk data comprises an indication of a number of seats in the vehicle or an indication of seatbelts in the vehicle; and sending, via the processor, a notification for assistance to an external device based on the probability that the potential incident has occurred, the severity of the potential incident, or any combination thereof.

19. The method of claim 18, comprising determining, via the processor, a towing service associated with the vehicle in response to determining, via the processor, that the probability that the potential incident has actually occurred exceeds a probability threshold, wherein the external device is associated with the towing service.

20. The method of claim 18, wherein the external device is associated with an emergency service in response to determining, via the processor, that the severity of the potential incident exceeds a severity threshold.

* * * * *